March 28, 1939.
R. E. MARBURY
2,151,786
ARC WELDING SYSTEM
Filed Nov. 24, 1937
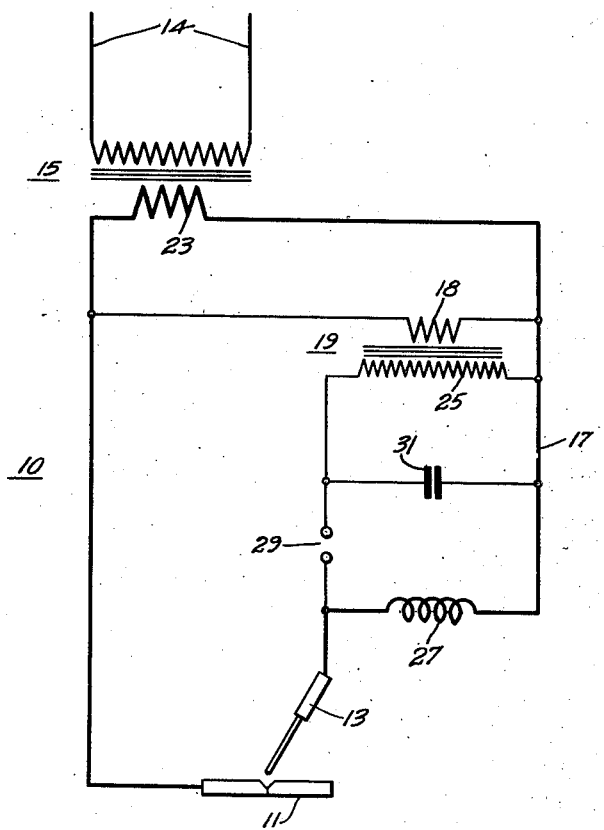
WITNESSES:
C. J. Weller.
F. V. Giolma
INVENTOR
Ralph E. Marbury.
BY
ATTORNEY Patented Mar. 28, 1939

2,151,786

UNITED STATES PATENT OFFICE 2,151,786

ARC WELDING SYSTEM

Ralph E. Marbury, Wilkinsburg, Pa., assignor to Westinghouse Electric & Manufacturing Company, East Pittsburgh, Pa., a corporation of Pennsylvania Application November 24, 1937, Serial No. 176,250

10 Claims. (Cl. 219—8)

My invention relates, generally, to arc welding, and it has particular reference to alternating current arc welding systems.

Heretofore, direct current welding systems have generally been preferred by welding operators primarily because of the ease with which a direct current arc may be maintained. Alternating current welding systems, though used to a great extent because of the widespread use of alternating current power, have generally required auxiliary means for stabilizing the arc and preventing its extinction as the current passes through the zero point of its cycle. In some instances, alternating current arc welding systems have been developed using a certain proportion of direct current in the welding circuit in order to facilitate maintenance of the arc, but, in general, use has been made of high frequency auxiliary control circuits for applying a high frequency high potential voltage to the electrode to prevent extinction of the arc as the welding current passes through the zero point of its cycle.

Such high frequency control circuits have, however, generally been relatively complicated, comprising, for example, a plurality of condensers and inductance coils, or a plurality of vacuum tube circuits in connection with the necessary relays and switches for providing a reliable source of high frequency arc-stabilizing control potential.

While alternating current welding machines using these systems have performed satisfactorily, such control systems have not only made the welding machines relatively expensive to manufacture, but they have also proved difficult to maintain and repair because of their complexity.

It is, therefore, generally an object of my invention to provide an alternating current arc welding system that shall be simple in construction, economical to manufacture, and easy to operate and maintain.

More specifically, it is an object of my invention to provide a simple, high frequency auxiliary control circuit in connection with a welding transformer having relatively poor regulation for automatically operating to stabilize an electric arc in an arc welding circuit.

Another object of my invention is to provide an auxiliary high frequency control circuit for an alternating current arc welding system wherein the high frequency control circuit is automatically energized upon interruption of the welding arc.

Still another object of my invention is to utilize a variation in terminal voltage of a welding transformer, from no load to full load, for automatically deenergizing an auxiliary high frequency control circuit while the welding operation is being performed.

Other objects of my invention will, in part, be obvious, and, in part, be described hereinafter.

For a complete understanding of the nature and scope of my invention, reference may be had to the following detailed description, taken in connection with the accompanying drawing, of which the single figure represents diagrammatically an arc welding system embodying a preferred form of my invention.

Referring generally to the single figure of the accompanying drawing, the reference numeral 10 may denote an arc welding circuit, including work 11 and an electrode 13, which is disposed to be connected to a source of alternating current power 14 by a transformer 15, while an auxiliary high frequency control circuit 17 may be disposed in connection therewith for stabilizing an arc between the electrode 13 and work 11.

In practicing a preferred embodiment of my invention, the primary winding 18 of an auxiliary control transformer 19 may be energized from the secondary winding 23 of the welding transformer 15, while its secondary winding 25 is connected with the auxiliary high frequency control circuit 17.

In order that the high frequency control circuit 17 may apply a high frequency potential to the welding circuit 10 to maintain an arc between the electrode 13 and work 11, an inductance coil 27 may be disposed in series circuit relation with the welding circuit, and the secondary winding 25 of the control transformer 19 connected thereacross, in series circuit relation with a spark gap 29. A condenser 31, which is disposed in shunt circuit relation with the secondary winding 25 of the control transformer 19, will then provide a series resonant circuit, comprising condenser 31, inductance coil 27 and a spark gap 29, which can be made to oscillate at a relatively high frequency when energized by the control transformer 19.

By utilizing welding transformer 15, having relatively poor voltage regulation, it is apparent that the variation in voltage across the primary winding 18 of the control transformer 19 from no-load to full-load may be made relatively large. In this manner the voltage applied by the secondary winding 25 of the control transformer to the condenser 31 of the high frequency control circuit will likewise vary over a large range, depending on whether the welding circuit is open or closed.

In the design of the spark gap 29, provision may be made for the breakdown thereof only when the voltage across the condenser 31 is above a predetermined value, such that the voltage of the welding circuit is substantially higher than the normal arc voltage. It is, therefore, apparent that by so calibrating the spark gap 29, the high frequency control circuit 17 may be made to oscillate only when the voltage of the arc between the electrode 13 and work 11 rises above a value where the arc is stable. In this manner the spark gap 29 may be made to break down, and the high frequency stabilizing potential applied to stabilize an arc between the electrode 13 and work 11 only when the arc voltage is substantially higher than under normal welding conditions, and the arc is, therefore, relatively unstable and likely to be extinguished as the welding current passes through the zero point of its cycle.

During a welding operation, when the arc is short, and relatively stable, the stabilizing effect of the high frequency voltage is not essential. In this embodiment of my invention, since the voltage across the primary winding 18 of the auxiliary control transformer 19 will be relatively low when a welding operation is being performed, the voltage applied across the resonant high frequency circuit 17 will not be sufficient to cause the spark gap 29 to break down, and no current will flow in the secondary winding 25 of the auxiliary control transformer 19. It is, therefore, possible by my invention to utilize a control transformer of smaller capacity than would be permissible if the high frequency circuit were energized continuously and the transformer continuously loaded. Likewise, the condenser 31 may be of smaller capacity, owing to the intermittent energizing of the high frequency control circuit, and the manufacturing costs of the auxiliary control system may be substantially reduced.

It may be seen, therefore, by reference to the above detailed description that by my invention I have provided simple and effective means for controlling the energization of an auxiliary high frequency arc stabilizing circuit in accordance with conditions of the welding circuit which determine the need for the arc stabilizing voltage to be applied at the arc, and have, therefore, provided a simple and effective alternating current welding circuit which will greatly facilitate the manufacture and maintenance of alternating current welding machines.

Since certain changes may be made in the above construction, and different embodiments of the invention may be made without departing from the spirit thereof, it is intended that all matter contained in the above description, or shown in the accompanying drawing shall be considered as illustrative and not in a limiting sense.

I claim as my invention:

1. In combination, a source of power, a welding circuit disposed to be energized from the source, and a high frequency control circuit energizable from the welding circuit when the welding circuit is open to apply a high frequency voltage to the welding circuit.

2. In a welding system the combination of a relatively low frequency source of current, a welding circuit including an electrode adapted to maintain an arc on an article being welded when energized from the source, and an auxiliary high frequency stabilizing circuit disposed in connection with the welding circuit to be energized upon interruption of the arc.

3. The combination in an arc welding system of a relatively low frequency source of power, a welding circuit including an electrode adapted to maintain an arc on a workpiece, transformer means for connecting the welding circuit to the source, and an auxiliary control circuit energizable from the welding circuit except when a welding operation is being performed to automatically reestablish the arc at the electrode.

4. An arc welding system comprising, in combination, a relatively low frequency source of welding current, a welding circuit including an electrode adapted to maintain an arc with a piece being welded, transformer means for connecting the welding circuit to the source of current, an auxiliary high frequency arc stabilizing circuit connected with the welding circuit, and an auxiliary control transformer disposed in connection with the welding circuit to energize the high frequency stabilizing circuit when the arc is interrupted.

5. In an arc welding system the combination of a relatively low voltage welding circuit, a low frequency source of welding current, a relatively high leakage reactance transformer adapted to connect the welding circuit to the source, a relatively high voltage high frequency arc stabilizing circuit comprising a resonant circuit and a spark gap adapted to breakdown at a predetermined potential, and an auxiliary control transformer energized from the welding circuit disposed to energize the resonant circuit when the voltage of the welding circuit rises above a predetermined value.

6. In an arc welding system the combination of a relatively low frequency source of welding current, a welding circuit including an electrode adapted to maintain an arc on a workpiece, a welding transformer having relatively poor voltage regulation for connecting the welding circuit to the source, an auxiliary high frequency control circuit disposed in connection with the welding circuit to sustain an arc between the electrode and the work, and an auxiliary control transformer connected with the welding circuit for energizing the control circuit when the voltage of the welding circuit is substantially higher than the normal arc voltage.

7. In combination in an arc welding system, a relatively low frequency source of current, a welding circuit including an electrode adapted to maintain an arc with an object being welded, a relatively high leakage reactance transformer disposed to connect the welding circuit to the source, reactance means disposed in the welding circuit, circuit means including a condenser and a spark gap disposed in connection with the reactance means to provide a resonant high frequency source of arc stabilization, and a control transformer operable from the welding circuit to energize the aforementioned circuit means and automatically apply an arc stabilizing high frequency voltage to the electrode when the arc voltage rises above a predetermined value.

8. An arc welding system comprising, in combination, a welding circuit including a current limiting reactance disposed in series circuit relation with a welding electrode, a welding transformer for supplying a relatively low frequency welding current to the welding circuit, said transformer having relatively poor voltage regulation, an auxiliary high frequency oscillation circuit including said current limiting reactance, and a control transformer disposed to be connected in shunt circuit relation with the welding circuit for energizing the oscillation circuit when the welding circuit is interrupted.

9. The combination in an arc welding system of, a welding circuit including an electrode disposed to maintain an arc with an object being welded, a low frequency source of power, a relatively high leakage reactance transformer connected with the source for applying a relatively low voltage to the welding circuit, an auxiliary high frequency oscillation circuit including a spark gap, a condenser and reactance means, said reactance means being connected in series circuit relation with the welding circuit, and an auxiliary control transformer connected with the high leakage reactance transformer for energizing the oscillation circuit, said oscillation circuit being adapted to apply a high frequency arc stabilizing voltage to the electrode when the voltage across the welding circuit becomes higher than the normal arc voltage.

10. In an arc welding system the combination of a welding circuit including an electrode for maintaining an arc with a workpiece, a relatively low frequency source of power, a transformer having loosely coupled primary and secondary windings connected for supplying power to the welding circuit at a relatively low voltage, an auxiliary high frequency oscillation circuit including a condenser, a spark gap disposed to breakdown at a predetermined potential and reactance means for connecting the circuit to the welding circuit, and an auxiliary control transformer disposed in connection with the first mentioned transformer for energizing the auxiliary circuit when the arc voltage reaches a predetermined value, whereby a high frequency high potential is applied to the electrode to stabilize the arc.

RALPH E. MARBURY.